United States Patent
Huang

(10) Patent No.: US 7,333,022 B2
(45) Date of Patent: Feb. 19, 2008

(54) SAFETY MONITORING MECHANISM OF A WAFER FABRICATION PLATFORM

(75) Inventor: Yu-Hung Huang, Chu Pei (TW)

(73) Assignee: Welltech Semiconductor Inc., Chu Pei, Hsin Chu Hsien (TW)

( * ) Notice: Subject to any disclaimer, the term of this patent is extended or adjusted under 35 U.S.C. 154(b) by 191 days.

(21) Appl. No.: 11/104,452

(22) Filed: Apr. 13, 2005

(65) Prior Publication Data
US 2006/0232432 A1    Oct. 19, 2006

(51) Int. Cl.
*G08B 21/00*    (2006.01)

(52) U.S. Cl. ............ 340/657; 340/661; 340/3.31; 340/3.32; 340/5.32; 340/446; 340/448; 356/355; 356/381; 356/382; 356/504; 356/632

(58) Field of Classification Search ........ 340/657, 340/661, 3.31, 3.32, 5.32, 446, 448; 356/355, 356/381, 382, 504, 632
See application file for complete search history.

(56) References Cited

U.S. PATENT DOCUMENTS 6,859,760 B2 *    2/2005    Dorough .............. 702/188
7,212,125 B2 *    5/2007    Shanks et al. ........ 340/572.7

* cited by examiner

*Primary Examiner*—Tai Nguyen

(57) ABSTRACT

A safety monitoring mechanism of a wafer fabrication platform is disclosed. The mechanism comprises a vibration sensor mounted at the loading apparatus of the wafer fabrication platform for detecting vibration generated during the operation of the loading apparatus; a determination module for receiving the vibration detected by the vibration sensor and to convert the vibration into digital signals and for contrast analysis with the preset standard signal range; and an alarm apparatus which produces an alarm signal to operator when the detected digital signal by the vibration sensor exceeds the standard signal range for being abnormal after contrast analysis with that of the module.

30 Claims, 3 Drawing Sheets

SAFETY MONITORING MECHANISM OF A WAFER FABRICATION PLATFORM

BACKGROUND OF THE INVENTION (a) Technical Field of the Invention

The present invention relates to a safety monitoring mechanism, and in particular, a safety monitoring mechanism of semiconductor wafer fabrication platform, which can instantaneously detect and rectify the abnormalities of the fabrication process at the initial and final stage.

(b) Description of the Prior Art

A plurality of wafer fabrication process integrate into a platform include Precision 5000, Endura, Centura and Producer and are commonly available in Market. The platform of the conventional fabrication process includes a center delivery chamber provided with a plurality of reaction chamber for fabrication processes, and a loading apparatus is provided to the chamber for transferring the wafers between individual chambers. The differences between these platforms include the number and kinds of fabrication, and other related devices.

As shown in FIG. 1, the Centura fabrication platform 1 includes a center delivery chamber 10 having four reaction chamber 11, a cooling chamber 12, an air pressure cleaning chamber 13, and two loading chamber 14. The delivery chamber 10 includes a loading apparatus 15 for transferring wafer between individual chambers 11, and the four reaction chamber 11 includes etching, CVD, high temperature CVD, and physical vapor phase deposition process. The two loading chamber 14 is connected to a small size cleaning room 16 and one side of the small cleaning room 18 is a wafer loading device 17 to provide to-be treated wafer and the wafers via the loading chamber 14 are transferred to the delivery chamber 10.

The fabrication platform utilizes a loading apparatus to carry the wafer and the wafers are transported between individual reaction chambers. However, the loading apparatus generally includes a mechanical arm, and the loading apparatus of the fabrication platform has become out of date and in the course of loading the wafer to the reaction chamber or taking out the wafer from the reaction chamber, impacts may occur and this will damage the wafer. Generally, the tear and wear of the platform will only be noticed after the wafers have been fabricated. Thus, the wafers that fabricated may have defects.

SUMMARY OF THE INVENTION

The primary purpose of the present invention is to provide a safety monitoring mechanism for wafer fabrication platform comprising a vibration sensor mounted at the loading apparatus of the wafer fabrication platform for detecting vibration generated during the operation of the loading apparatus; a determination module for receiving the vibration detected by the vibration sensor and to convert the vibration into digital signals and for contrast analysis with the preset standard signal range; and an alarm apparatus which produces an alarm signal to operator when the detected digital signal by the vibration sensor exceeds the standard signal range for being abnormal after contrast analysis with that of the module.

Yet another object of the present invention is to provide a safety monitoring mechanism for wafer fabrication platform comprising a sound sensor mounted at the loading apparatus of the wafer fabrication platform for detecting vibration generated during the operation of the loading apparatus; a determination module for receiving the sound detected by the sound sensor and to convert the sound into digital signals and for contrast analysis with the preset standard signal range; and an alarm apparatus which produces an alarm signal to operator when the detected digital signal by the sound sensor exceeds the standard signal range for being abnormal after contrast analysis with that of the module.

Still a further object of the present invention is to provide a safety monitoring mechanism for wafer fabrication platform comprising a deformation sensor mounted at the loading apparatus of the wafer fabrication platform for detecting vibration generated during the operation of the loading apparatus; a determination module for receiving the deformation detected by the deformation sensor and to convert the deformation into digital signals and for contrast analysis with the preset standard signal range; and an alarm apparatus which produces an alarm signal to operator when the detected digital signal by the deformation sensor exceeds the standard signal range for being abnormal after contrast analysis with that of the module.

A further object of the present invention is to provide a safety monitoring mechanism for wafer fabrication platform comprising a vibration sensor mounted at the loading apparatus of the wafer fabrication platform for detecting vibration generated during the operation of the loading apparatus; a sound sensor mounted at the loading apparatus of the wafer fabrication platform for detecting vibration generated during the operation of the loading apparatus; an alarm apparatus which produces an alarm signal to operator when the detected digital signal by the deformation sensor exceeds the standard signal range for being abnormal after contrast analysis with that of the module; a determination module for receiving the vibration detected by the vibration sensor and to convert the vibration into digital signals and for contrast analysis with the preset standard signal range; and an alarm apparatus which produces an alarm signal to operator when the detected digital signal by the vibration sensor exceeds the standard signal range for being abnormal after contrast analysis with that of the module.

Another object of the present invention is to provide a safety monitoring mechanism of a wafer fabrication platform, wherein based on the displacement of the loading apparatus of the fabrication platform at the initial stage and the final stage, any abnormality can be detected instantaneously and rectified. Thus the yield in the wafer fabrication process is improved.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
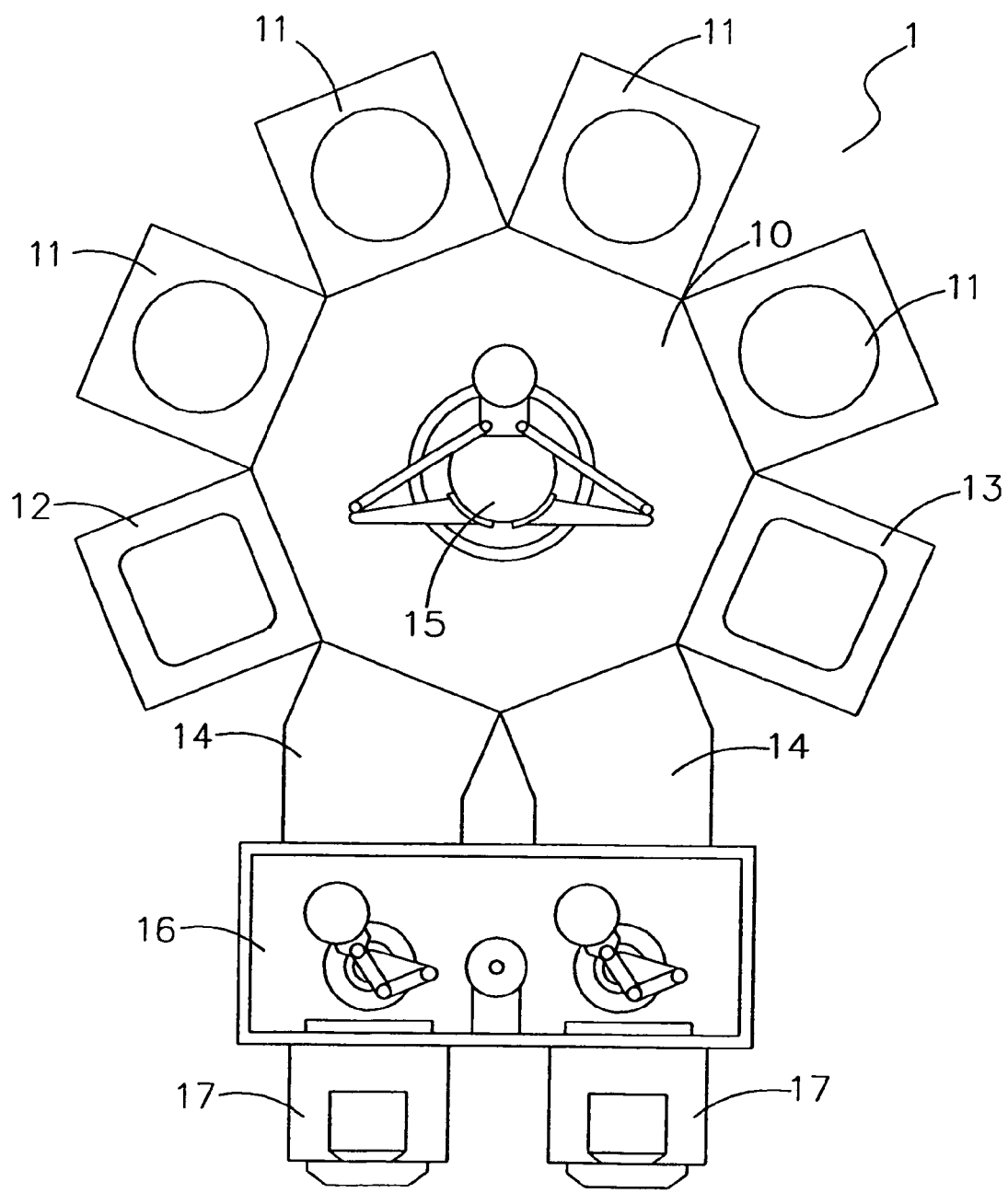
FIG. 1 is a schematic view showing the Centura fabrication platform.
Figure 2:
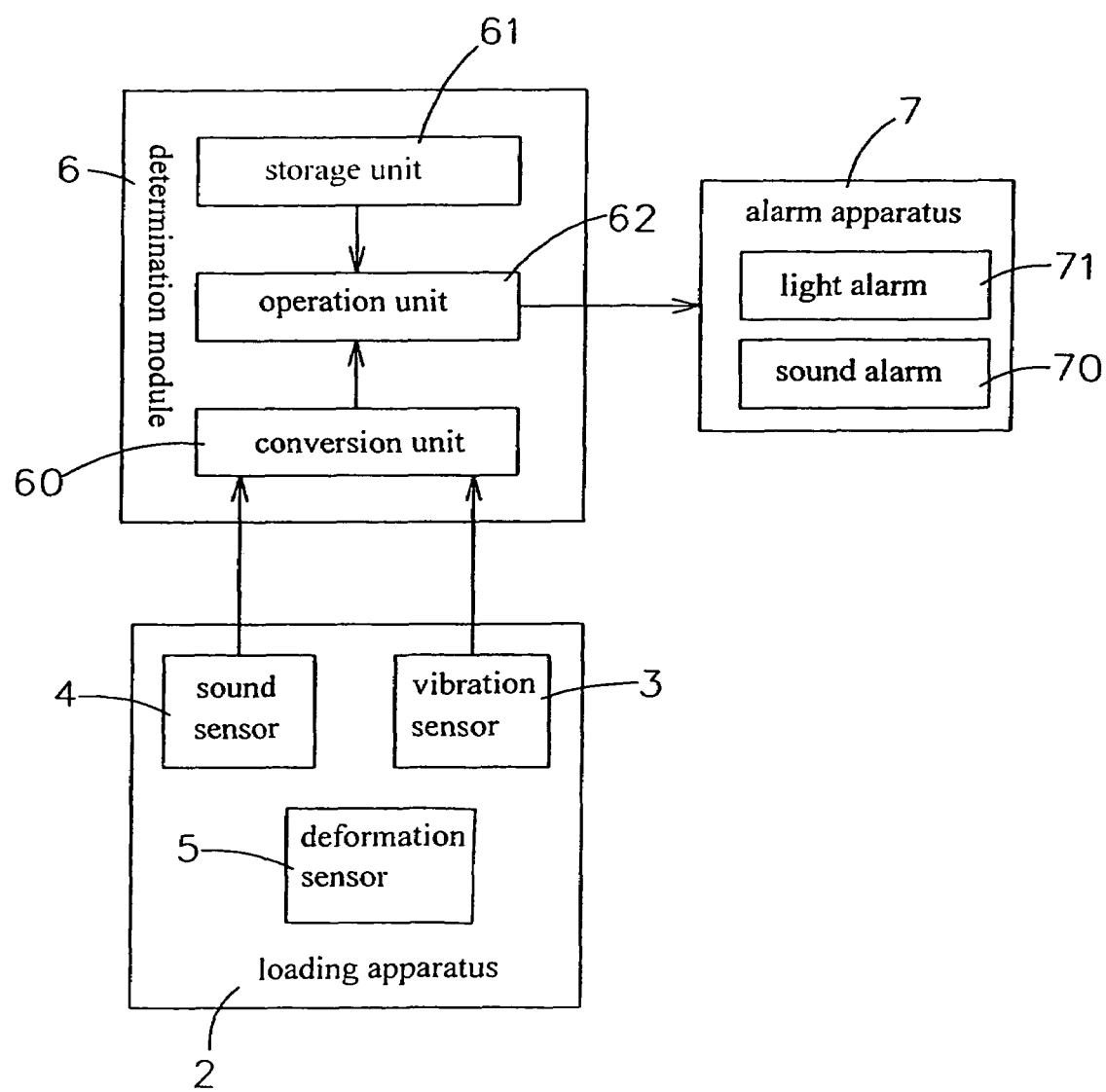
FIG. 2 is a system block diagram of the first preferred embodiment of the present invention.

Referring to FIG. 2, there is shown a system block diagram of the first preferred embodiment of the wafer fabrication platform of the present invention. In accordance with the present invention, the safety monitoring comprises a vibration sensor 3 mounted at the loading apparatus of the wafer fabrication platform for detecting vibration generated during the operation of the loading apparatus; a sound sensor 4 mounted at the loading apparatus of the wafer fabrication platform for detecting vibration generated during the operation of the loading apparatus; an alarm apparatus which produces an alarm signal to operator when the detected digital signal by the deformation 5 sensor exceeds the standard signal range for being abnormal after contrast analysis with that of the module; a determination module 6 for receiving the vibration detected by the vibration sensor 3 and to convert the vibration into digital signals and for contrast analysis with the preset standard signal range; and an alarm apparatus which produces an alarm signal to operator when the detected digital signal by the vibration sensor 3 exceeds the standard signal range for being abnormal after contrast analysis with that of the module.

The determination module 6 includes a conversion unit 60, a storage unit 61 and an operation unit 62. The conversion unit 60 receives the detected vibration or sound or curvature or displacement rate from the vibration sensor 3 or the sound sensor 4, or deformation 5 and coverts that into digital signals. The storage unit 61 pre-stores or preset the standard signal range (being the normal range of vibration frequency or sound frequency or curvature or the displacement rate. The operation unit 62 is for the comparing or contrasting analysis between the digital signal converted by the conversion unit 60 with the pre-stored or preset signal range at the storage unit 61. The curvature or the displacement rate is preferred method of calculation.

The alarm apparatus 7 includes a sound alarming indicator 70 and an alarm light indicator 71 such that when the determination module 6 detects the digital signal detected by the vibration sensor 3 or the sound sensor 4 or the deformation sensor 5 exceeds the standard signal range for being abnormal, an alarming sound or light will produce to remind the operator.

Figure 3:
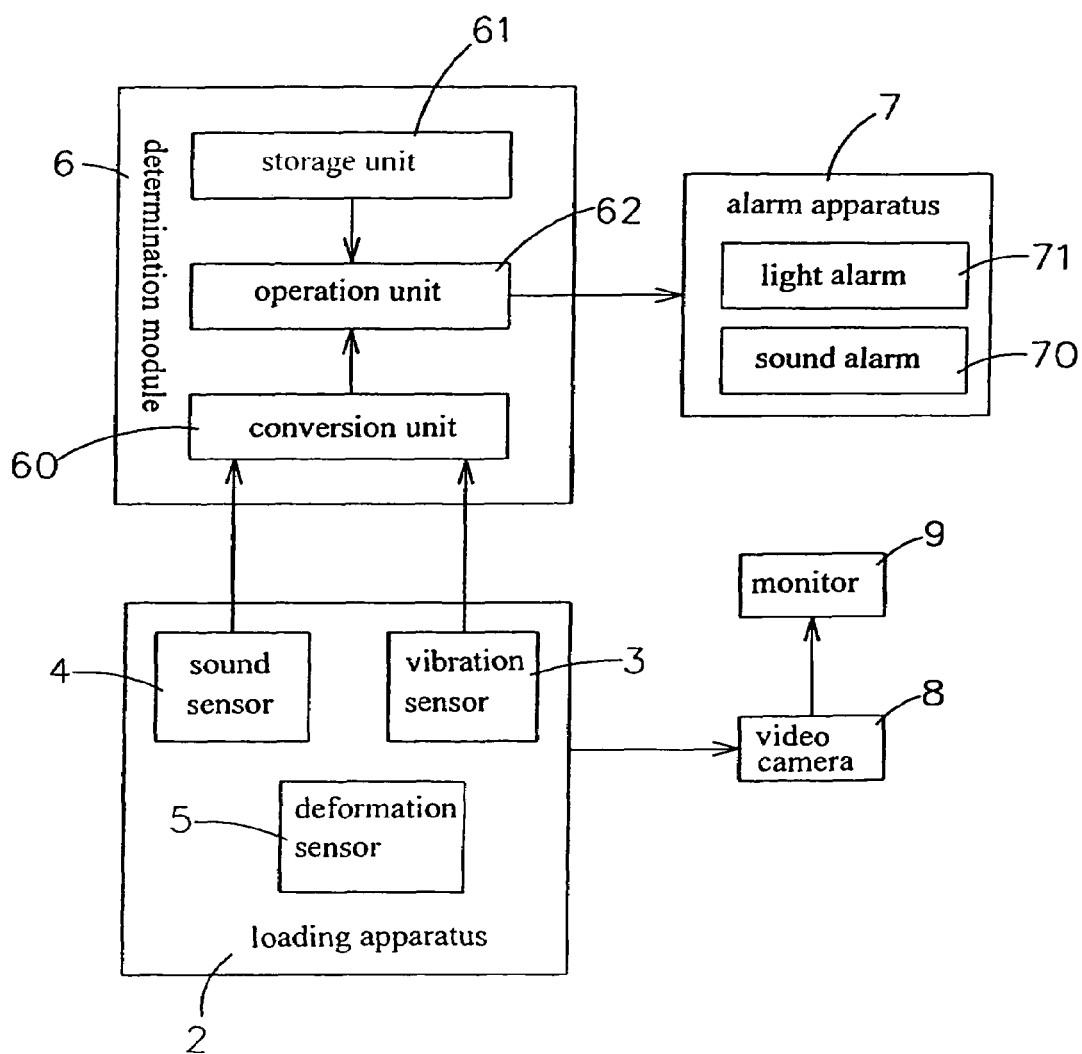
FIG. 3 is another system block diagram of a second preferred embodiment of the present invention.

Referring to FIG. 3, there is shown a second preferred embodiment in accordance with the present invention. The structure of the second preferred embodiment is substantially similar to that of the first preferred embodiment of the present invention. The second preferred embodiment further comprises at least a video camera 8 and at least a monitor 9. The video camera 9 is functioned to a photography or video the operation of the loading apparatus 2. The monitor 9 is functioned to display the contents photographed or video by the video camera 8. The video camera 8 and the monitor 9 starts to operate instantaneously when the fabrication platform starts operating, or when the determination module 6 discovers abnormality.

In accordance with the present invention, the vibration sensor 3 or sound sensor 4 or the deformation sensor 5 is used to detect the course of operation of the loading apparatus 2 of the wafer fabrication platform. Thus, the initial and final stage of the abnormalities in the course of the operation of the fabrication platform can be instantaneously discovered and rectified. Thus, the yield of the wafer fabrication process is improved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A safety monitoring mechanism for wafer fabrication platform comprising:
   a vibration sensor mounted at a loading apparatus of the wafer fabrication platform for detecting vibration generated during an operation of the loading apparatus;
   a determination module for receiving the vibration detected by the vibration sensor and to convert the vibration into digital signals and for contrast analysis with a preset standard signal range; and
   an alarm apparatus which produces an alarm signal to operator
   when the detected digital signal by the vibration sensor exceeds the standard signal range for being abnormal after contrast analysis with that of the module.

2. The safety monitoring mechanism of claim 1, wherein the determination module includes:
   a conversion unit for converting the detected vibration from the vibration sensor or the detected sound from the sound sensor or the deformation from the deformation sensor into digital signals;
   a storage unit for pre-storing or presetting standard signal range; and
   an operation unit for comparing or contrasting analysis between digital signal converted by said conversion unit with the pre-stored or presetting signal range at said storage unit.

3. The safety monitoring mechanism of claim 1, wherein the alarm apparatus includes a sound alarm to produce an alarming sound.

4. The safety monitoring mechanism of claim 1, wherein the alarm apparatus includes a light alarm to produce an. alarming light.

5. The safety monitoring mechanism of claim 1, further including a video camera and a monitor, wherein the video camera photographs the operation of the loading apparatus and the display shows the contents photographed by the video camera.

6. The safety monitoring mechanism of claim 5, wherein the video camera and the monitor are triggered immediately the fabrication platform is initiated.

7. The safety monitoring mechanism of claim 5, wherein the video camera and the monitor are triggered when the determination module discovers abnormality.

8. A safety monitoring mechanism for wafer fabrication platform comprising:
   a sound sensor mounted at a loading apparatus of the wafer fabrication platform for detecting vibration generated during an operation of the loading apparatus;
   a determination module for receiving the sound detected by the sound sensor and to convert the sound into digital signals and for contrast analysis with a preset standard signal range; and
   an alarm apparatus which produces an alarm signal to operator
   when the detected digital signal by the sound sensor exceeds the standard signal range for being abnormal after contrast analysis with that of the module.

9. The safety monitoring mechanism of claim 8, wherein the determination module includes:
   a conversion unit for converting the detected vibration from the vibration sensor or the detected sound from the sound sensor or the deformation from the deformation sensor into digital signals;
   a storage unit for pre-storing or presetting standard signal range; and
   an operation unit for comparing or contrasting analysis between digital signal converted by said conversion unit with the pre-stored or presetting signal range at said storage unit.

10. The safety monitoring mechanism of claim 8, wherein the alarm apparatus includes a sound alarm to produce an alarming sound.

11. The safety monitoring mechanism of claim 8, wherein the alarm apparatus includes a light alarm to produce an alarming light.

12. The safety monitoring mechanism of claim 8, further including a video camera and a monitor, wherein the video camera photographs the operation of the loading apparatus and the display shows the contents photographed by the video camera.

13. The safety monitoring mechanism of claim 12, wherein the video camera and the monitor are triggered immediately the fabrication platform is initiated.

14. The safety monitoring mechanism of claim 12, wherein the video camera and the monitor are triggered when the determination module discovers abnormality.

15. A safety monitoring mechanism for wafer fabrication platform comprising:
   a deformation sensor mounted at a loading apparatus of the wafer fabrication platform for detecting vibration generated during an operation of the loading apparatus;
   a determination module for receiving the deformation detected by the deformation sensor and to convert the deformation into digital signals and for contrast analysis with a preset standard signal range; and
   an alarm apparatus which produces an alarm signal to operator
   when the detected digital signal by the deformation sensor exceeds the standard signal range for being abnormal after contrast analysis with that of the module.

16. The safety monitoring mechanism of claim 15, wherein the determination module includes:
   a conversion unit for converting the detected vibration from the vibration sensor or the detected sound from the sound sensor or the deformation from the deformation sensor into digital signals;
   a storage unit for pre-storing or presetting standard signal range; and
   an operation unit for comparing or contrasting analysis between digital signal converted by said conversion unit with the pre-stored or presetting signal range at said storage unit.

17. The safety monitoring mechanism of claim 15, wherein the alarm apparatus includes a sound alarm to produce an alarming sound.

18. The safety monitoring mechanism of claim 15, wherein the alarm apparatus includes a light alarm to produce an alarming light.

19. The safety monitoring mechanism of claim 15, further including a video camera and a monitor, wherein the video camera photographs the operation of the loading apparatus and the display shows the contents photographed by the video camera.

20. The safety monitoring mechanism of claim 19, wherein the video camera and the monitor are triggered immediately the fabrication platform is initiated.

21. The safety monitoring mechanism of claim 19, wherein the video camera and the monitor are triggered when the determination module discovers abnormality.

22. A safety monitoring mechanism for wafer fabrication platform comprising:
   a vibration sensor mounted at a loading apparatus of the wafer fabrication platform for detecting vibration generated during an operation of the loading apparatus;
   a sound sensor mounted at a loading apparatus of the wafer fabrication platform for detecting vibration generated during an operation of the loading apparatus;
   an alarm apparatus which produces an alarm signal to operator
   when a detected digital signal by a deformation sensor exceeds
   a standard signal range for being abnormal after contrast analysis with that of the module;
   a determination module for receiving the vibration detected by the vibration sensor and to convert the vibration into digital signals and for contrast analysis with a preset standard signal range; and
   an alarm apparatus which produces an alarm signal to operator
   when the detected digital signal by the vibration sensor exceeds the standard signal range for being abnormal after contrast analysis with that of the module.

23. The safety monitoring mechanism of claim 22, wherein the determination module uses curvature as a calculation method for determination.

24. The safety monitoring mechanism of claim 22, wherein the determination module uses the amount of displacement as a calculation method for determination.

25. The safety monitoring mechanism of claim 22, wherein the determination module includes:
   a conversion unit for converting the detected vibration from the vibration sensor or the detected sound from the sound sensor or the deformation from the deformation sensor into digital signals;
   a storage unit for pre-storing or presetting standard signal range; and
   an operation unit for comparing or contrasting analysis between digital signal converted by said conversion unit with the pre-stored or presetting signal range at said storage unit.

26. The safety monitoring mechanism of claim 22, wherein the alarm apparatus includes a sound alarm to produce an alarming sound.

27. The safety monitoring mechanism of claim 22, wherein the alarm apparatus includes a light alarm to produce an alarming light.

28. The safety monitoring mechanism of claim 22, further including a video camera and a monitor, wherein the video camera photographs the operation of the loading apparatus and the display show the contents photographed by the video camera.

29. The safety monitoring mechanism of claim 28, wherein the video camera and the monitor are triggered immediately the fabrication platform is initiated.

30. The safety monitoring mechanism of claim 28, wherein the video camera and the monitor are triggered when the determination module discovers abnormality.

* * * * *